United States Patent
Amano et al.

(10) Patent No.: US 6,420,035 B1
(45) Date of Patent: Jul. 16, 2002

(54) METAL MATERIAL SUBJECTED TO TREATMENT FOR SEIZURE PREVENTION AND METHOD FOR PRODUCTION THEREOF

(75) Inventors: Satoshi Amano; Norimasa Nakamura, both of Chiba; Shoji Kuroyama, Osaka, all of (JP)

(73) Assignees: Nisshinbo Industries, Inc., Tokyo; Takenaka Seisakusho Co., Ltd, Osaka, both of (JP)

( * ) Notice: Subject to any disclaimer, the term of this patent is extended or adjusted under 35 U.S.C. 154(b) by 0 days.

(21) Appl. No.: 09/547,097

(22) Filed: Apr. 11, 2000

(30) Foreign Application Priority Data

Apr. 13, 1999 (JP) .......................................... 11-105221

(51) Int. Cl.$^7$ .............................................. B32B 27/40
(52) U.S. Cl. ........................... 428/425.8; 411/1; 24/564
(58) Field of Search ........................... 428/425.8; 411/1, 411/903, 914; 24/564

(56) References Cited

U.S. PATENT DOCUMENTS 4,206,060 A * 6/1980 Yamamoto et al. ......... 508/118
5,249,898 A * 10/1993 Stepanski et al. .............. 411/82
5,486,299 A * 1/1996 Fuwa et al. .................... 252/12
5,853,890 A * 12/1998 Odawa et al. ............... 428/412
5,856,014 A * 1/1999 Imashiro et al. ......... 428/425.8
6,008,311 A * 12/1999 Sakamoto et al. ............. 528/74

* cited by examiner

Primary Examiner—Paul Thibodeau
Assistant Examiner—Christopher Paulraj
(74) Attorney, Agent, or Firm—Kubovcik & Kubovcik

(57) ABSTRACT

A metal material subjected to a treatment for seizure prevention is provided. The metal material includes a metal base material and a film formed thereon, the film being composed of a carbodiimide group-containing resin obtained from an aromatic polyisocyanate or of a mixture of said carbodiimide group-containing resin and a lubricant. A method for producing a metal material subjected to a treatment for seizure prevention is also provided. The method includes coating, on a metal base material, a carbodiimide group-containing resin obtained from an aromatic polyisocyanate or a mixture of said carbodiimide group-containing resin and a lubricant, and then subjecting the coated metal base material to a heat treatment at a temperature of 120° C. or higher.

9 Claims, No Drawings

METAL MATERIAL SUBJECTED TO TREATMENT FOR SEIZURE PREVENTION AND METHOD FOR PRODUCTION THEREOF

BACKGROUND OF THE INVENTION

1. Field of the Invention

The present invention relates to a metal material subjected to a treatment for seizure prevention, as well as to a method for producing such a metal material.

2. Description of the Prior Art

In cold or hot working of a metal, when the metal to be worked causes seizure onto a rolling roller or tool, the seizure is printed on a metal of later working, allowing the latter metal to have surface flaw. In such a case, the rolling roller or tool is subjected to surface grinding, or is disposed as scrap in some cases; as a result, the productivity or workability is reduced and the rolling roll or tool has a shorter life.

In metal-made clamping materials such as bolts, nuts, washers and the like, local metal-to-metal friction is generated during the clamping (sliding) and, as no insertion is used which, even when a large load has been applied between metals, is not broken and can prevent metal-to-metal fusion bonding, seizure appears during the clamping and no intended axial force can be achieved. Consequently, the clamping becomes insufficient, which invites leakage at a site where a liquid passes or gives a structure of insufficient strength.

In metal-made clamping materials such as bolts, nuts, washers and the like, seizure appears not only during the clamping but also during the removal (dismantling) often for the same reason. In the latter case, a bolt is required to be removed by melting or cutting, which has posed great danger depending upon the working environment or has reduced working efficiency significantly, in some cases.

Further, clamping materials such as mentioned above have often caused seizure during the removal owing to the deterioration caused by heat, corrosion, etc.

The flaw on a metal product caused by the above-mentioned seizure is a serious problem in cold or hot plastic working (e.g. plate rolling, tube rolling, bar steel rolling, wire rolling, extrusion, drawing or forging) of:

(A) a metal material having a passivated film on the surface, such as stainless steel, titanium or its steel alloy, aluminum or its steel alloy, or the like, (B) a metal material of low hardness, low thermal conductivity and high thermal expansion coefficient, or (C) a thin metal.

The following techniques are mainly known as solutions for the above problem.

(1) Lubrication by liquid or oil film of machine oil, grease or the like.

(2) Use of solid lubricant such as iron oxide powder (JP-A-63-254195 and JP-A-64-83309), graphite (JP-A-1-167396), calcium sulfate or potassium sulfate (JP-A-54-123105), fluorinated graphite, molybdenum disulfide, tungsten disulfide or highly basic metal sulfonate (JP-A-5-306397 or JP-A-5-306399), highly basic metal phenate; or phosphonic acid ester (JP-9-40983) or fluororesin powder (JP-A-62-250054).

(3) Polymer film or fluorine film (JP-A-5-180383)

The above techniques, however, still have the following drawbacks.

Technique (1)

A liquid or oil film is easily broken by sliding and loses its effect; the kind of liquid or oil must be selected so as to match the material to which the film is applied; working environment is easily stained with the liquid or oil.

Technique (2)

An iron oxide powder, calcium sulfate and potassium sulfate are insufficient for prevention of seizure or wear; graphite, etc. have too low a friction coefficient and invites, during rolling, insufficient biting of to-be-rolled material and slippage; solid lubricants are broken as well at a sliding site and lose the effect and, in particular, polymer materials are easily broken for the softness.

Technique (3)

A polymer film has low adhesion to metal and finds limited application; moreover, the film has a limitation in thermal resistance.

SUMMARY OF THE INVENTION

The present invention aims at providing a metal material subjected to a treatment for seizure prevention, which can alleviate the problems of the prior art and which when processed into a clamping material used for land or marine structures, etc., can prevent seizure (which may occur in initial clamping or repeated clamping) and enables clamping and removal (dismantling) a plurality of times; and a method for producing such a metal material.

The present invention provides:

a metal material subjected to a treatment for seizure prevention, comprising a metal base material and a film formed thereon, composed of a carbodiimide group-containing resin obtained from an aromatic polyisocyanate or of a mixture of said carbodiimide group-containing resin and a lubricant; and a method for producing a metal material subjected to a treatment for seizure prevention, which method comprises coating, on a metal base material, a carbodiimide group-containing resin obtained from an aromatic polyisocyanate or a mixture of a lubricant and said carbodiimide group-containing resin, and then subjecting the coated metal base material to a heat treatment at a temperature of 120° C. or higher.

DETAILED DESCRIPTION OF THE INVENTION

The present invention is described in detail below.

The "carbodiimide group-containing resin obtained from an aromatic polyisocyanate" used in the present invention includes not only a polycarbodiimide resin obtained from an aromatic polyisocyanate but also its mixture with other appropriate resin, and can be any resin containing carbodiimide group.

As to the content of carbodiimide group in "carbodiimide group-containing resin obtained from an aromatic polyisocyanate", there is no particular restriction. However, when the content is too low, there is a fear that no film is formed when such a resin is coated on a metal base material and subjected to a heat treatment.

The polycarbodiimide obtained from an aromatic polyisocyanate is known per se and is synthesized generally by decarboxylation and condensation of polyisocyanate in the presence of a catalyst, as shown in the following reaction formula. In the following formula, n refers to an average polymerization degree and is an integer of 2 or more.

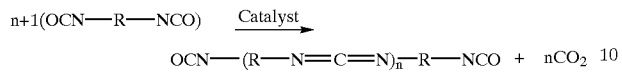

$$n+1(OCN-R-NCO) \xrightarrow{Catalyst} OCN-(R-N=C=N)_n-R-NCO + nCO_2$$

The polycarbodiimide resin obtained from an aromatic polyisocyanate can specifically be produced, for example, by a method disclosed in JP-A-51-61599, a method by L. M. Alberin et al. [J. Appl. Polym. Sci., 21, 1999 (1997)], or a method disclosed in JP-A-2-292316. That is, it can be produced from an organic polyisocyanate in the presence of a catalyst which promotes the carbodiimidization of isocyanate.

As the organic polyisocyanate, there can be mentioned, for example, 2,4-tolylene diisocyanate, 2,6-tolylene diisocyanate, a mixture of 2,4-tolylene diisocyanate and 2,6-tolylene diisocyanate, crude tolylene diisocyanate, crude methylene diphenyl diisocyanate, 4,4',4"-triphenylmethylene triisocyanate, xylene diisocyanate, m-phenylene diisocyanate, naphtylene-1,5-diisocyanate, 4,4'-biphenylene diisocyanate, diphenylmethane-4,4'-diisocyaante, 3,3'-dimethoxybiphenyl diisocyanate, 3,3'-dimethyldiphenylmethane-4,4'-diisocyanate, and mixtures thereof.

The above organic polyisocyanates are all aromatic polyisocyanates. In the present invention, there are used a polycarbodiimide resin obtained from an aromatic polyisocyanate, because such a polycarbodiimide becomes a film when its varnish is subjected to solvent removal, and is highly reactive and, when heated, gives rise to crosslinking between carbodiimide groups.

The above polycarbodiimide may be one produced with the molecular weight being controlled by blocking the terminal with, for example, at least one kind of monoisocyanate to stop polycondensation of aromatic polyisocyanate at a certain stage. The monoisocyanate used to block the terminal of polycarbodiimide and control its molecular weight can be exemplified by phenyl isocyanate, o-, m- or p-tolyl isocyanate, dimethyl phenyl isocyanate, cyclohexyl isocyanate and methyl isocyanate.

As is easily inferred, the terminal-blocking agent may also be a compound having a terminal such as —OH, —NH$_2$, —COOH, —SH or —NH-alkyl.

As the catalyst which promotes the carbodiimidization of isocyanate, used in the present invention, there can be mentioned various catalysts. However, preferred are, from the standpoints of yield, etc., 1-phenyl-2-phosphorene-1-oxide, 3-methyl-2-phosphorene-1-oxide, their phosphorene isomers, etc.

The synthesis of the above polycarbodiimide resin can be conducted in a solvent or in a solvent-free state. As the solvent, any solvent can be used as long as it is inactive in carbodiimidization and can dissolve the polycarbodiimide resin synthesized. Specific examples of such a solvent are aromatic hydrocarbons such as benzene, toluene, xylylene, ethylbenzene and the like; halogenated hydrocarbons such as chlorobenzene, dichlorobenzene, trichlorobenzene, tetrachloroethylene, trichloroethane, dichloroethane and the like; ether type solvents such as tetrahydrofuran, dioxane, diethylene glycol dimethyl ether and the like; and ketone type solvents such as methyl ethyl ketone, methyl isobutyl ketone, cyclohexanone and the like; and acetate type solvents such as 2-methoxyethyl acetate, diethylene glycol monomethyl ether acetate and the like.

As the polycarbodiimide resin, there may also be used an aqueous solution or dispersion of a polycarbodiimide resin which has been subjected to a hydrophilization treatment with a polyethylene glycol or the like. This solution or dispersion must be able to form a film when coated on a metal material and then heat treated.

In the present invention, a resin other than the polycarbodiimide resin can be used in combination with the polycarbodiimide resin. There is no particular restriction as to the kind of the former resin, but it is preferably a resin which is uniformly miscible with the polycarbodiimide resin without impairing the effect of the present invention.

The metal base material used in the present invention is preferably a metal which is low in hardness and thermal conductivity and high in thermal expansion coefficient, especially. Examples thereof are alloy steels, iron, titanium, titanium alloys, aluminum and aluminum alloys. Of these, preferred are alloy steels such as stainless steel, Cr—Mo steel, Mn—Mo steel and Ni—Cr steel.

The applications of the metal material of the present invention include, for example, clamping materials such as bolts, nuts, washers and the like.

The metal material of the present invention can be obtained simply by forming, on the above-mentioned metal base material, a film of a carbodiimide group-containing resin obtained from an aromatic polyisocyanate. Use of a lubricant in combination with the above resin allows the resulting metal material to have a higher effect.

The lubricant used in the present invention can be any lubricant as long as it is miscible with the carbodiimide group-containing resin obtained from an aromatic polyisocyanate. Specific examples thereof include molybdenum disulfide, tungsten disulfide, graphite and fluororesin. Tungsten disulfide is particularly preferred.

The amount of the lubricant used is preferably 30% by weight or less based on the carbodiimide group-containing resin obtained from an aromatic polyisocyanate. With this amount range, good sliding property can be obtained. The lubricant can be mixed with the resin by, for example, mill dispersion.

The coating, on a metal base material, of the carbodiimide group-containing resin obtained from an aromatic polyisocyanate or of a mixture of the resin and the lubricant, can be conducted by a known method such as brush coating, dipping, air spraying or the like. Prior to the coating of the carbodiimide group-containing resin obtained from an aromatic polyisocyanate or of a mixture of the resin and the lubricant, it is preferred to subject the surface of the metal base material to degreasing or, after the degreasing, apply shot blasting.

After the coating of the carbodiimide group-containing resin obtained from an aromatic polyisocyanate or of a mixture of the resin and the lubricant, a heat treatment may be conducted in order to (1) evaporate the solvent in the resin and (2) accelerate the self-crosslinking (dimerization and/or trimerization) of polycarbodiimide resin, to form a film of high strength and excellent sliding property. The temperature of the heat treatment can be, for example, 120° C. or more, preferably 180° C. or more.

In the heat treatment, it is possible to add a catalyst for acceleration of the crosslinking of polycarbodiimide resin. Specific examples of such a catalyst are diazabicycloundecene, tris(dialkylaminoalkyl)hexahydro-s-triazine, sodium acetate, potassium acetate and tertiary amines.

The film after the heat treatment preferably has a thickness of 100 μm or less. With a thickness of 100 μm or less, there occurs no cracking in the film during the heat treatment, and the film after the heat treatment can exhibit good sliding property.

In the present invention, various other additives such as rust preventive and the like can be added as necessary in amounts which do not impair the sliding property of film. Addition of, for example, zinc dust, chromium pigment, silica or aluminum pigment can improve the rust prevention of resin film; addition of fine silica powder [Aerosil (trade name)] can prevent the precipitation of lubricant.

The present invention utilizes the properties of the carbodiimide group-containing resin obtained from an aromatic polyisocyanate. The resin is considered to exhibit the following action mechanism. When the carbodiimide group-containing resin obtained from an aromatic polyisocyanate is coated on a metal base material to form a film, the inner layer of the film, i.e. the film portion contacting the metal has strong adhesion to the metal owing to the effect of the carbodiimide group of the film, and the outer (surface) layer of the film, when a shear stress is applied thereto, tends to be shaved and become fine particles owing to the effect of the crosslinked structure of carbodiimide groups formed by heat treatment. That is, the surface layer of the film, which comes in contact with other metal, exhibits sliding property and acts as a solid lubricant. Thus, the film made of the carbodiimide group-containing resin shows different properties in the inner layer and the surface layer; therefore, the invention can offer a metal material which hardly shows seizure, which enables repeated clamping and removal (dismantling), and which exhibits excellent sliding property.

The present invention is described in more detail below by way of Examples.

Synthesis of Polycarbodiimide

Synthesis Examples 1

Into a 3-liter four-necked flask provided with a stirrer and a cooling apparatus were fed 320 g of tolylene diisocyanate (hereinafter referred to as TDI), 9.13 g of phenyl isocyanate (hereinafter referred to as PI), 3,600 g of tetrachloroethylene (a solvent) and 0.64 g of 3-methyl-1-phenyl-2-phosphorene-1-oxide (a catalyst). The mixture was subjected to carbodiimidization at 120° C. for 8 hours, whereby was obtained a light yellow transparent polycarbodiimide solution. The polycarbodiumide was measured for number-average molecular weight (hereinafter referred to as Mn; Mn is a polystyrene-reduced value in the present invention) by gel permeation chromatography (GPC). The Mn was $6.8 \times 10^3$. The polycarbodiimide solution is called as Varnish 1.

Synthesis Example 2

Into a 3-liter four-necked flask provided with a stirrer and a cooling apparatus were fed 320 g of TDI, 4.56 g of PI, 3,600 g of tetrachloroethylene (a solvent) and 0.64 g of 3-methyl-1-phenyl-2-phosphorene-1-oxide (a catalyst). The mixture was subjected to carbodiimidization at 120° C. for 9 hours, whereby was obtained a light yellow transparent polycarbodiimide solution. The polycarbodiimide was measured for number-average molecular weight by GPC. The Mn was $1.4 \times 10^4$. The polycarbodiimide solution is called as Varnish 2.

Synthesis Example 3

Into a 2-liter four-necked flask provided with a stirrer and a cooling apparatus were fed 450 g of 4,4'-diphenylmethane diisocyanate and 165 g of MPG 081 (polyoxymethylene glycol produced by Nippon Nyukazai Co., Ltd.). The mixture was stirred at 90° C. for 5 hours. Next 910 g of tetrahydrofuran (hereinafter referred to as THF) (a solvent) and 0.95 of 3-methyl-1-phenyl-2-phosphorene-1-oxide (a catalyst) were fed, and carbodiimidization was conducted at 75° C. for 15 hours, whereby was obtained a light yellow polycarbodiimide solution. The polycarbodiimide was measured for number-average molecular weight (Mn) by GPC. The Mn was $3.5 \times 10^3$. Then, while the reactor inside was made vacuum using a vacuum pump to distill the solvent (THF), ion-exchanged water was fed into the reactor, whereby a white emulsion having a solids content of 30% by weight was obtained finally. The emulsion is called as Varnish 3.

EXAMPLES 1–6

Comparative Examples 1–3

(Torque test)

A composition shown in Table 1 was spray-coated on a bolt (SUS 304, M20 diameter), a nut and a washer and then subjected to a heat treatment at 350° C. for 30 minutes. The thickness of the formed resin film was 10 to 20 μm. The thus-obtained resin-processed bolt, nut and washer were subjected to a torque test using a torque tester produced by Kawatetsu Advantech Co., Ltd. The results are shown in Table 2.

Incidentally, the torque coefficient shown in Table 2 is given by the following formula:

$$k = [T/(d \times N)] \times 1000$$

wherein k is a torque coefficient, T is a clamping torque (kgf-m), d is the nominal diameter (mm) of bolt, and N is an axial force (kgf).

TABLE 1

| | Composition of film | |
|---|---|---|
| | Kind of resin | Lubricant (wt. % used) |
| Example 1 | Varnish 1 | Not used |
| Example 2 | Varnish 3 | Not used |
| Example 3 | Varnish 1 | PTFE (15) |
| Example 4 | Varnish 2 | $WS_2$ (15) |
| Example 5 | Varnish 3 | PTFE (15) |
| Example 6 | Varnish 3 | $WS_2$ (15) |
| Comparative Example 1 | Not used | Not used |
| Comparative Example 2 | Epoxy resin | Not used |
| Comparative Example 3 | Phenolic resin | Not used |

In Comparative Example 1, a metal base material not subjected to any surface treatment was used.
PTFE: polytetrafluoroethylene
$WS_2$: tungsten disulfide

TABLE 2

| | Times of testing | Axial force (kgf) | | |
|---|---|---|---|---|
| | | 5000 | 7500 | 10000 |
| Example 1 | 1 | 29 (0.29) | 40 (0.26) | 62 (0.31) |
| | 2 | 31 (0.31) | 42 (0.28) | 62 (0.31) |
| | 3 | 33 (0.33) | 44 (0.30) | 66 (0.33) |
| Example 2 | 1 | 26 (0.26) | 43.5 (0.29) | 62 (0.31) |
| | 2 | 28 (0.28) | 43.5 (0.29) | 60 (0.30) |
| | 3 | 28 (0.28) | 48 (0.32) | 72 (0.36) |
| Example 3 | 1 | 14 (0.14) | 24 (0.16) | 32 (0.16) |
| | 2 | 16 (0.16) | 25.5 (0.17) | 36 (0.18) |
| | 3 | 16 (0.16) | 24 (0.16) | 34 (0.17) |
| Example 4 | 1 | 12 (0.12) | 16.5 (0.11) | 22 (0.11) |
| | 2 | 11 (0.11) | 18 (0.12) | 24 (0.12) |
| | 3 | 12 (0.12) | 15 (0.10) | 24 (0.12) |
| Example 5 | 1 | 14 (0.14) | 22.5 (0.15) | 34 (0.17) |
| | 2 | 12 (0.12) | 21 (0.14) | 28 (0.14) |
| | 3 | 14 (0.14) | 22.5 (0.15) | 32 (0.16) |
| Example 6 | 1 | 12 (0.12) | 18 (0.12) | 24 (0.12) |
| | 2 | 12 (0.12) | 19.5 (0.13) | 26 (0.13) |
| | 3 | 10 (0.10) | 16.5 (0.11) | 22 (0.11) |
| Comparative Example 1 | 1 | 51 (0.51) | 81 (0.53) | 101 (0.51) |
| | 2 | *1 | | |
| | 3 | | | |
| Comparative Example 2 | 1 | 48 (0.48) | 82 (0.55) | 98 (0.49) |
| | 2 | 53 (0.53) | *2 | |
| | 3 | *1 | | |
| Comparative Example 3 | 1 | 53 (0.53) | 90 (0.6) | *2 |
| | 2 | *1 | | |
| | 3 | | | |

In Table 2, each value refers to a torque (kgf-m) and each value in parenthesis refers to a torque coefficient.

In Table 2, "scuffing" refers to a state immediate before the appearance of fusion bonding at the contact area of bolt, nut and washer and makes impossible the exact measurement of torque, etc. Application of larger force results in the appearance of fusion bonding at the contact area of bolt, nut and washer and makes impossible the measurement of torque, etc.

According to Table 2, no fusion bonding appeared in Examples and the torque at a given axial force was smaller in Examples than in Comparative Examples, indicating that clamping and removal of bolt and nut by smaller force is possible in Examples.

From Table 2, it is further appreciated that the torque coefficient is smaller as well in Examples than in Comparative Examples. Particularly in Examples 3 to 6, the value is very small (0.1 to less than 0.2) and useful for seizure prevention.

EXAMPLES 7–10

Comparative Examples 4–5

(Drawing test)

A composition shown in Table 3 was spray-coated on a M22 type bolt material [SUS 304 or steel material (boron steel, 15 B 36 produced by Shinko)] and then subjected to a heat treatment at 350° C. for 30 minutes. The thickness of the film formed was 10 to 13 μm. The resulting sample was subjected to a drawing test from Φ24 to Φ22 at a pressure of 120 to 130 kg/cm² for 4 seconds. The results are shown in

TABLE 3

| | Composition of film | |
|---|---|---|
| | Kind of resin | Lubricant (wt. % used) |
| Examples 7 and 9 | Varnish 1 | Not used |
| Examples 8 and 10 | Varnish 2 | $WS_2$ |
| Comparative Examples 4 and 5 | Not used | Not used |

TABLE 4

| | Material | Result |
|---|---|---|
| Example 7 | SUS 304 | ○ |
| Example 8 | SUS 304 | ○ |
| Example 9 | 15 B 36 | ○ |
| Example 10 | 15 B 36 | ○ |
| Comparative Example 4 | SUS 304 | X |
| Comparative Example 5 | 15 B 36 | X |

○: Drawing was possible.
X: Fusion bonding and scuffing appeared and drawing was impossible.

As is clear from Table 4, the metal material comprising a metal base material and a resin film formed thereon, according to the present invention is improved in sliding property regardless of the kind of the metal base material used and can effectively prevent seizure.

As is clear from Examples and Comparative Examples, the metal material of the present invention has excellent sliding property and is superior in seizure prevention. Use of the present metal material as a clamping material, for example, enables repeated clamping and removal; therefore, the present metal material can suitably used in structures.

What is claimed is:

1. A clamping material made from a metal material subjected to a treatment for seizure prevention, comprising a metal base material and a film formed thereon, said film composed of a self-crosslinked carbodiimide group-containing resin obtained from an aromatic polyisocyanate, wherein said clamping material is selected from the group consisting of a bolt, a nut, and a washer.

2. A clamping material according to claim 1, wherein the self-crosslinked carbodiimide group-containing resin is a resin obtained from tolylene diisocyanate or diphenylmethane-4,4'-diisocyanate.

3. A clamping material according to claim 1, wherein the metal base material is produced from a base material selected from the group consisting of alloy steels, titanium, titanium alloys, aluminum, aluminum alloys and iron.

4. A clamping material according to claim 1, wherein said film has a thickness of 100 μm or less.

5. A clamping material made from a metal material subjected to a treatment for seizure prevention, comprising a metal base material and a film formed thereon, said film composed of a self-crosslinked carbodiimide group-containing resin obtained from an aromatic polyisocyanate and a lubricant, wherein said clamping material is selected from the group consisting of a bolt, a nut, and a washer.

6. A clamping material according to claim 5, wherein the lubricant is selected from the group consisting of molybdenum disulfide, tungsten disulfide, graphite and a fluororesin.

7. A clamping material according to claim 5, wherein the carbodiimide group-containing resin is a resin obtained from tolylene diisocyanate or diphenylmethane-4,4'-diisocyanate.

8. A clamping material according to claim 5, wherein the metal base material is produced from a base material selected from the group consisting of alloy steels, titanium, titanium alloys, aluminum, aluminum alloys and iron.

9. A clamping material according to claim 5, wherein said film has a thickness of 100 μm or less.

* * * * *